(12) United States Patent
Bleys et al.

(10) Patent No.: US 7,287,548 B2
(45) Date of Patent: Oct. 30, 2007

(54) INTEGRATED VALVE ASSEMBLY WITH MEANS FOR BLOCKING THE ACTUATOR

(75) Inventors: Christian Bleys, Livry s/Seine (FR); Philippe Rudnianyn, Longpont sur Orge (FR); Pedro Collado, Ozoir la Ferrière (FR)

(73) Assignee: Taema, Antony (FR)

( * ) Notice: Subject to any disclaimer, the term of this patent is extended or adjusted under 35 U.S.C. 154(b) by 511 days.

(21) Appl. No.: 10/933,099

(22) Filed: Sep. 2, 2004

(65) Prior Publication Data
US 2006/0042723 A1 Mar. 2, 2006

(30) Foreign Application Priority Data
Sep. 3, 2003 (FR) .................................. 03 50495

(51) Int. Cl.
*F17D 1/00* (2006.01)
(52) U.S. Cl. ..................... 137/613; 137/505.25; 251/90
(58) Field of Classification Search ................ 137/613, 137/494, 505.43, 377, 382, 505.25; 251/89, 251/90, 92, 93
See application file for complete search history.

(56) References Cited

U.S. PATENT DOCUMENTS 4,928,919 A * 5/1990 Daicho et al. ................ 251/89
5,429,152 A * 7/1995 Van Straaten et al. ...... 137/377
5,937,895 A * 8/1999 Le Febre et al. ........... 137/494

FOREIGN PATENT DOCUMENTS

| DE | 23 55 950 | 5/1975 |
|---|---|---|
| FR | 1 550 319 | 12/1968 |
| GB | 0 867 642 | 5/1961 |
| GB | 1 425 891 | 2/1976 |

OTHER PUBLICATIONS

Search Report FR 0350495.

* cited by examiner

*Primary Examiner*—Kevin Lee
(74) *Attorney, Agent, or Firm*—Christopher J. Cronin

(57) ABSTRACT

An integrated valve assembly and apparatus. The assembly has a main body that includes (1) an internal gas passage for conveying gas between a gas inlet and a gas outlet; (2) a gas expansion means placed in the internal gas passage between the gas inlet and the gas outlet; (3) and a locking valve that is used for controlling the release of the gas. Also included is a rotary actuator that can be operated by the user. This rotary actuator includes a blocking means that acts on the rotary actuator to prevent rotation of the rotary actuator. The integrated valve assembly may be used in a portable equipment unit that includes a compressed-oxygen bottle on which the valve assembly is mounted, and may optionally include a protective shroud for protecting the assembly and a demand valve connected to oxygen therapy nose clips, to a flowmeter or to any other similar device.

17 Claims, 3 Drawing Sheets

INTEGRATED VALVE ASSEMBLY WITH MEANS FOR BLOCKING THE ACTUATOR

This application claims the benefit of priority under 35 U.S.C. § 119 (a) and (b) 1 to French Application No. 03 50495, filed Sep. 3, 2004, the entire contents of which are incorporated herein by reference.

BACKGROUND

The present invention relates to an integrated valve assembly and to ambulatory equipment that comprises such an integrated valve assembly mounted on a small compressed-gas bottle, which can be opened and used only if a use device for delivering gas, such as a flowmeter, a breathing valve, an opening tool for purging the bottle, or any other device using the gas, is connected thereto via a specific connection interface for releasing a lock which prevents rotation of the operating device for opening the valve and releasing the gas.

Ambulatory equipment using compressed gas or liquid oxygen sources currently exists.

Liquid oxygen sources are generally smaller and provide greater autonomy, which is often overly long for patients moving about over short distances.

However, the use of liquid oxygen is not ideal as evaporation of the liquid causes gas losses and having to use liquid oxygen is not advantageous, owing to its cost, when the patient is walking about for only a short time.

Moreover, the various types of equipment that exist using a compressed-gas source are somewhat impractical, bulky and often too heavy for patients receiving this type of treatment since they are often elderly or feeble.

In addition, the use of such equipment requires the use of pressure regulators whose interface with the bottle is exposed to very high pressures, i.e. of the order of 200 bar, which requires laborious and tricky operation for the user and is not without danger, in particular should there be a poor connection, insufficient maintenance or the unintentional presence of grease particles in the regions under high pressure.

Furthermore, these sources are generally used either with flowmeters or electronically controlled demand valves or pneumatically controlled valves.

Now, electronically controlled valves require an additional energy supply provided by a cell or batteries, which must be available at the time of use, something which is not always the case.

As regards pneumatically controlled valves, these use the energy of the stored gas for the main opening and the inspiration of the user as initiating command. Consequently, they are often more practical, more compact and lighter than valves requiring electrical energy.

The object of the present invention is to provide, on the one hand, equipment for delivering gas, particularly medical oxygen, which is lightweight, practical, very suitable for patients to carry around with them and of compact design, making it possible to optimize the total weight of the assembly, to minimize the connection forces as far as possible, to eliminate any intervention on those parts exposed to the high pressure and therefore to limit the associated risks, and also to provide, on the other hand, an integrated valve assembly which is safer than existing valve assemblies and can form part of such an ambulatory equipment when it is mounted on a small gas bottle, in particular a medical oxygen bottle.

SUMMARY

The solution of the invention is therefore an integrated valve assembly with a main body comprising:
- an internal gas passage for conveying gas between a gas inlet and a gas outlet;
- gas expansion means placed in the said internal gas passage between the said gas inlet and the said gas outlet; and
- a locking valve used for controlling the release of the gas and comprising a rotary actuator that can be operated by the user;

characterized in that it further includes blocking means that act on the rotary actuator of the locking valve so as normally to prevent any rotation of the said actuator.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
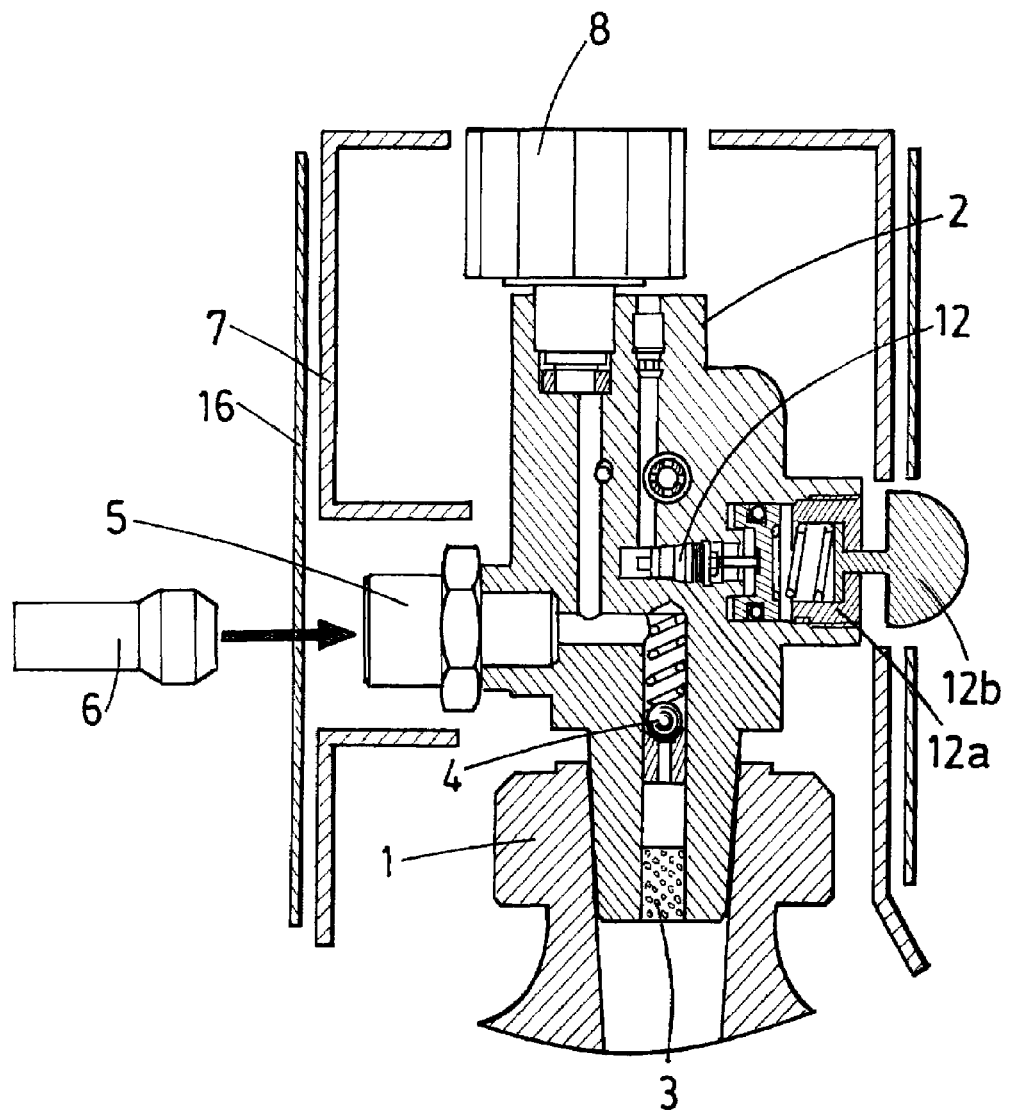
FIG. 1 illustrates a stylized cross-section of an integrated valve assembly, in accordance with one illustrative embodiment of the present invention.

The solution of the invention is an integrated valve assembly with a main body comprising:

Depending on the case, the valve assembly of the invention may include one or more of the following technical features:
- the blocking means comprise one or more moving parts that cooperate with the actuator so as to prevent its rotation and the release of the gas;
- at least one moving part is pushed back by spring means towards the ring so as to be at least partially housed in at least one recess provided in the actuator and designed to accommodate at least one portion of the said moving part so as to prevent the rotation of the actuator when a moving part is at least partially housed in a recess;
- the actuator is a rotary ring;
- the one or more spring means are springs;
- the one or more moving parts are pins, balls or the like;
- the actuator is centered on a boss of the valve assembly, the said boss supporting, in addition, the gas outlet for delivering the gas and connection means for connecting a gas use device provided with an inlet interface and with additional connection means capable of cooperating with the connection means and with the blocking means that act on the actuator so as to permit the actuator to rotate after the inlet interface of the gas use device has been connected to the outlet interface of the valve assembly;

the gas expansion means comprise a first expansion stage and a second expansion stage that are placed in the said internal gas passage, the second expansion stage lying downstream of the first expansion stage;

it furthermore includes a residual pressure valve, a pressure gauge for displaying the pressure available in the bottle, a filling connector, a filter and/or a safety valve for discharging any possible overpressure in the event of failure or rupture of the first expansion valve element of the first expansion stage;

it furthermore includes an instant action means, actuatable by the operator, which acts on the expansion means of the second expansion stage so as to instantly increase the released pressure and the flow rate of gas delivered, during the time that the said means is being actuated by the operator, the instant action means preferably being a button that compresses the piston release spring of the second expansion stage.

The invention also relates to portable ambulatory equipment, the weight of which is less than 2 kg, comprising a compressed-gas bottle onto which is fitted an integrated valve assembly according to the invention, the gas bottle preferably containing oxygen.

Depending on the case, the portable equipment of the invention may include one or more of the following technical features:

it furthermore includes a gas use device connected, via its inlet interface, to the outlet interface of the valve assembly, the said gas use device including complementary connection means that cooperate with the connection means of the outlet interface of the valve assembly and with the locking means that act on the actuator so as to permit the actuator to rotate and the gas to flow from the valve assembly to the gas use device;

the gas use device is chosen from demand valves and flowmeters; and it includes a protective shroud placed so as to protect the integrated valve assembly, the said protective shroud preferably being fastened to the valve assembly.

The ambulatory equipment of the invention, formed from a small compressed-oxygen bottle on which a small integrated valve assembly according to the invention is mounted, will now be described in greater detail by means of an exemplary embodiment, which is illustrated in the figures appended hereto.

In the example shown in FIGS. 1 to 4, the ambulatory equipment of the invention, fitted with the valve assembly 2 of the invention is connected to a demand valve 14 equipped with an oxygen therapy nose clip 15; however, this choice is not exhaustive and the description below remains generally valid for any other type of gas delivery device, such as a flowmeter, for example, equipped with the specific interface described below.

The portable ambulatory equipment of the invention, illustrated by FIGS. 1 to 4, forms an autonomous unit for a patient to carry around over short distances, making it possible to deliver a controlled flow rate of oxygen to the patient, at each inspiration of the user, by means of a demand valve 14 equipped with an oxygen therapy nose clip 15.

The oxygen is stored in the form of compressed gas in a small gas bottle 1 in which the valve assembly 2 of the invention is mounted, a demand valve 14 being attached thereto.

The small bottle 1 is filled with gas compressed to a high pressure via the specific coupler 5 of the valve assembly 2, by means of an external connector 6.

Figure 2:
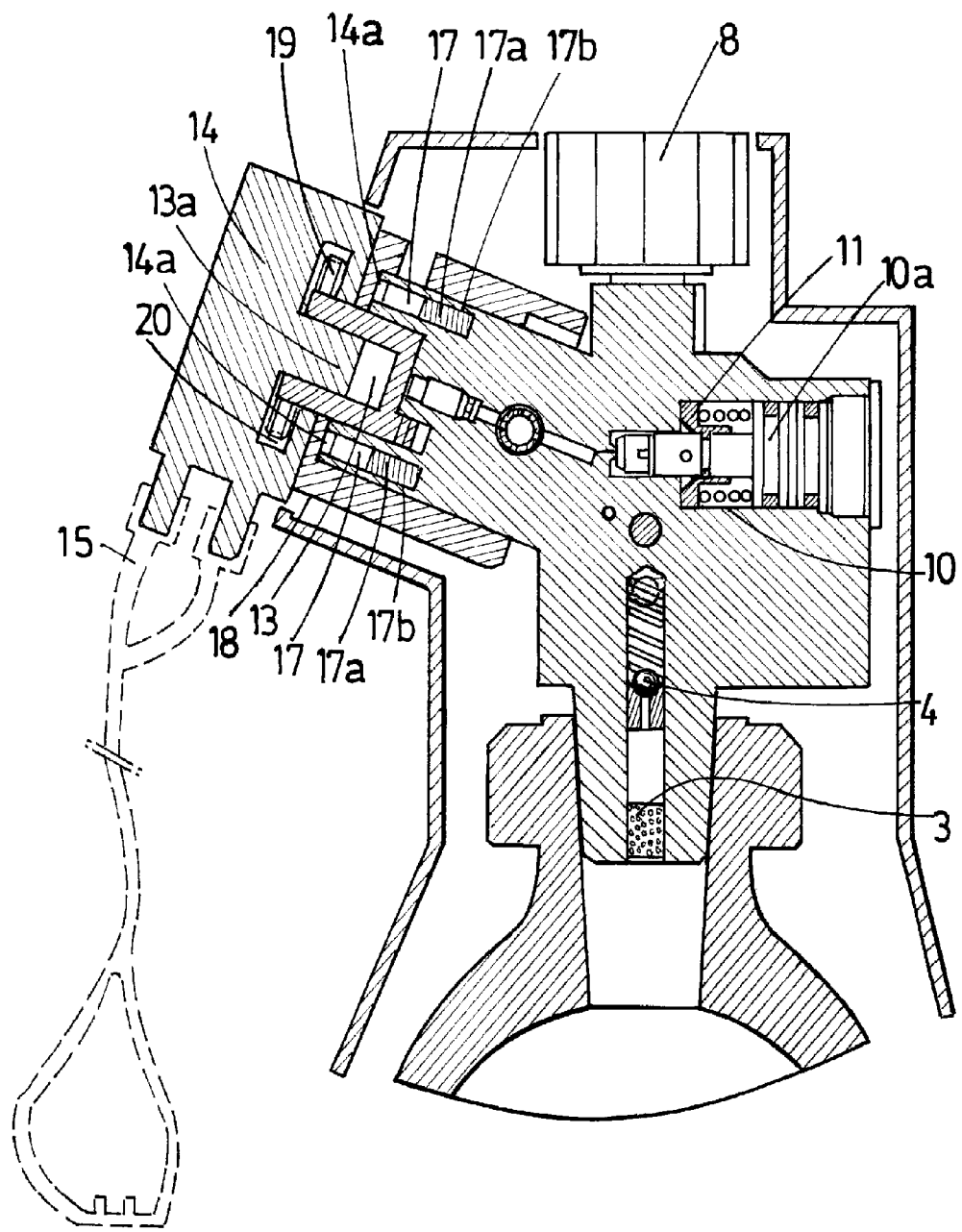
FIG. 2 illustrates a stylized cross-section of an integrated valve assembly, in accordance with another embodiment.

FIG. 1 shows the ambulatory equipment of the invention, which is composed here of a very small bottle 1, typically with a height of less than 30 cm, for high-pressure compressed gas, particularly medical-grade oxygen, on which the integrated valve assembly 2 of the invention is mounted, this comprising an internal filter 3, serving to protect the valve assembly, a residual pressure valve 4, a connector or inlet 5 for recharging with gas, accessible via a filling connector 6 through a protective shroud 7, for protecting the valve assembly 2 from being knocked, a pressure gauge 8, for displaying the pressure available in the bottle, a valve 9, for isolating the bottle, the operation of which will be explained in more detail below, and expansion means, comprising a first expansion stage 10 shown in FIG. 2, provided with a safety valve 11, and a second expansion stage 12.

The said first 10 and second 12 expansion stages comprise conventional expansion members, such as valve elements, valve seats, spring means, etc., allowing the gas to be expanded from its high pressure, that is to say the pressure of the gas leaving the bottle, for example 200 bar, down to its low pressure, that is to say its use pressure, for example 1 bar after passing through an intermediate pressure.

The valve assembly also includes a specific outlet interface 13 used for connection of the demand valve 14, the said connection allowing the rotary member 18 of the valve 9 to be unlocked, that is to say it is not possible to open the isolating valve 9 without beforehand connecting the valve 14 thereto, as will be explained below.

The oxygen therapy nose clip 15 is connected to the outlet of the demand valve 14 so as to supply the patient with oxygen at a pressure that has been reduced in the two expansion stages 10, 12. In fact, such a dual-expansion pressure reduction system 10, 12 makes it possible to guarantee a constant level of flow whatever the fill level of the bottle.

Advantageously, the valve assembly of the invention includes an optional means that can be actuated by the user, making it possible to momentarily increase the rate of flow of oxygen delivered subsequently to its actuation, for example by a button 12b actuated by pressing with a finger, and allowing the piston release spring of the second expansion stage 12 to be compressed, so as momentarily to increase the pressure delivered during the time the button is being pressed for the purpose of achieving an increase in the oxygen flow rate matched to the additional efforts of the patient.

The valve assembly 2 also includes a safety valve 11 for discharging any overpressure in the event of failure of the first expansion valve element of the first expansion stage 10.

More specifically, the valve assembly 2 is provided with a specific outlet interface carrying the locking valve 9 that commands the inflow and outflow of the gas, the said outlet interface being furthermore intended to receive a device 14 that uses the reduced-pressure oxygen delivered by the valve assembly 2, such as a flowmeter, a demand valve, or an opening tool needed to purge the gas from the bottle.

Figure 3:
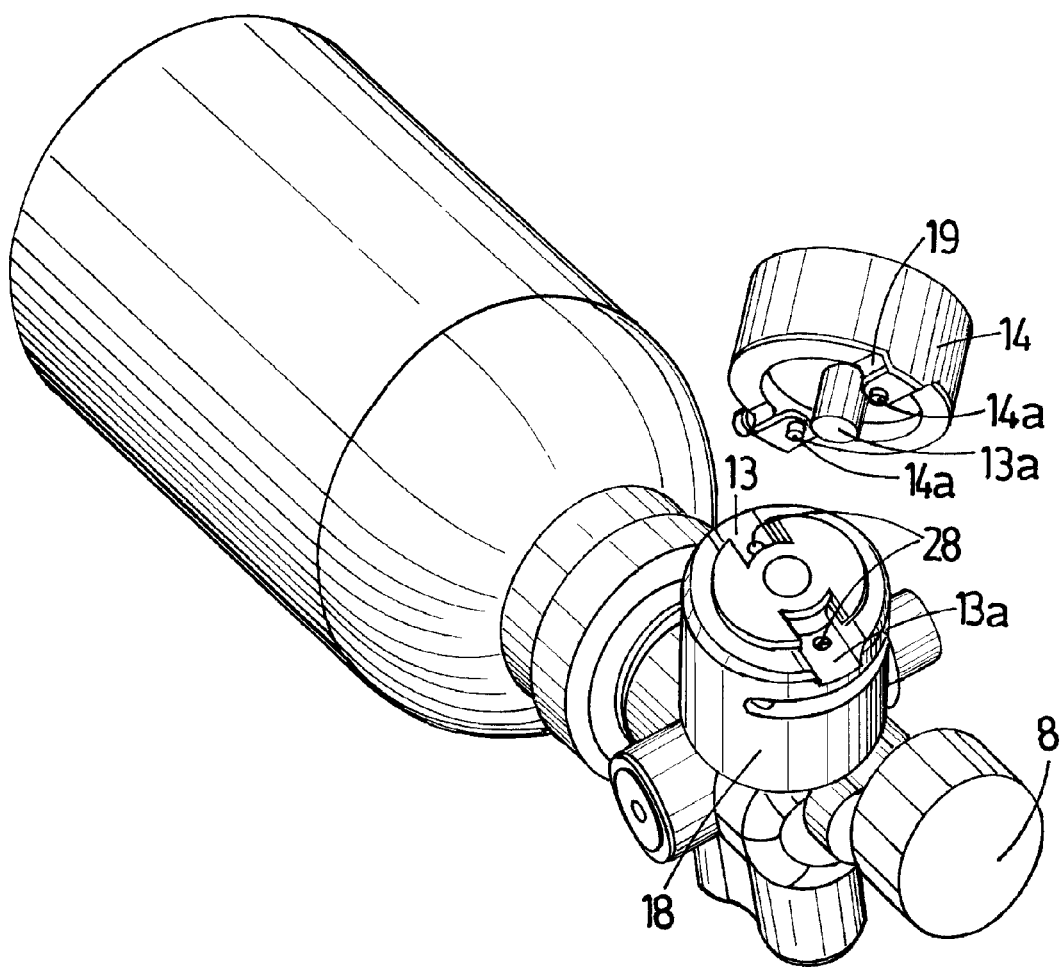
FIG. 3 illustrates an exploded view of an integrated valve assembly, shown along with a compressed-gas bottle, in accordance with one embodiment.
Figure 4:
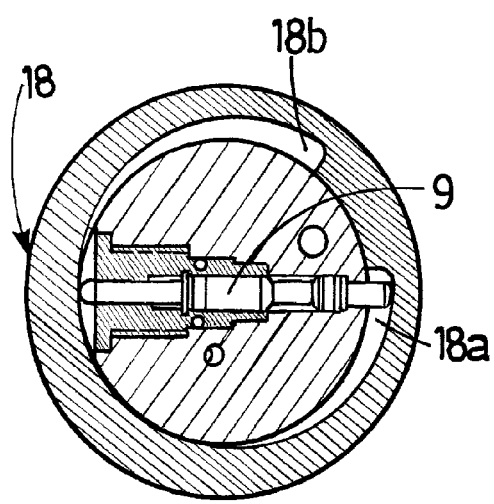
FIG. 4 illustrates a cross-section of the rotary actuator, in accordance with one embodiment.

According to the invention, the inlet interface of the device 14 using the gas, that is to say its connector, cooperates with the outlet interface of the valve assembly 2 so as to free up the rotation of the rotary operating member 18, such as a ring or wheel, of the locking valve 9, as illustrated in FIGS. 2 to 4.

Thus, opening the locking valve 9, that is to say releasing the gas, can only be accomplished once the use device 14 has been connected to the valve assembly 2.

In other words, the use device 14 has an inlet interface, acting as connector, complementary to the specific outlet interface of the valve assembly 2, which cooperate with each other so as to release the gas only when they are connected together, thanks to the presence of a locking valve 9 whose operating member 18 can be operated only after these parts have been suitably connected to each other.

In fact, the operation of a valve assembly 2 of the invention takes place as indicated below.

Firstly, the user selects a bottle 1 that is full, by checking the reading of the pressure gauge 8, removes the protective film that protects the outlet interface of the valve assembly 2 designed to receive the inlet interface of the demand valve 14.

As shown in FIG. 3, he then inserts the connection interface of the demand valve 14 into the central orifice 13 of the assembly provided with the locking valve 9, thereby releasing the member 18 for operating the locking valve 9 and then allowing gas to be released.

More precisely, unlocking the rotation of the operating member 18 is achieved by one or more buttons or studs 14a or the like that are on the demand valve pushing back one or more blocking pins or balls 17 or the like that are housed in the body of the valve assembly and act on the ring 18 for controlling the locking valve 9.

This is because, to prevent any rotation of the operating member 18, also called the actuator 18, when no device 14 is connected thereto, one or more blocking pins or balls 17 or the like are provided, each pin 17 being able to move in its housing 17b, by partly projecting out of the said housing 17b, under the effect of a spring force exerted on it by a spring means 17a located between the said pin 17 and the bottom of the housing 17b where the pin 17 is inserted, as shown schematically in FIG. 2.

That portion of each pin 17 projecting out of the housing 17b lodges in a recess or housing 28, of suitable dimensions, provided in the operating member 18, thereby preventing the said actuator 18 forming a ring around the valve 9 from rotating.

As may be seen in FIG. 2 and FIG. 3, the recesses or housings 28 are holes or orifices passing right through the wall of the actuating ring 18.

However, when a device 14 is connected to the valve assembly 2 of the invention, the pins or studs 14a carried by the inlet interface of the said device 14 act against complementary pins 17 in a direction tending to disengage them from the orifices 28 in the ring 18, and therefore pushing them back towards their housings 17b, thereby compressing the springs 17a and releasing the rotary ring 18 which is normally blocked in these pins 17.

This ring 18, thus released, can then be rotated by the operator until it comes into its open position limited by a stop, this being done so as to open the valve 9 and release the gas, the valve 9 being driven in a manner coupled to a rotation of the valve 14 about its axis. The valve assembly is then ready to deliver gas.

Once the valve 14 has been rotated as far as the "open valve" position it can no longer be disconnected.

This is because the pins 19 pass into the groove 20 in the interface of the valve 14, the latter therefore being trapped by the system until the user rotates the valve 14 into the reverse position until coming up against a stop.

When the valve 9 is open, that is to say, after the device 14 has been connected, the gas enters the expander of the first expansion stage, composed of a piston 10 and a valve 11, in order to be expanded from its high pressure down to a lower pressure, called the intermediate pressure or medium pressure.

Next, the gas expanded to the intermediate pressure enters the expander of the second expansion stage, composed of a valve 12 and a piston 12a, where it is expanded from the medium pressure down to low pressure, usually called the final pressure or use pressure.

However, the final pressure level may at any moment be increased by the user, by him pressing a button 12b, which compresses the expansion spring of the second expansion stage a little more. In other words, the possibility of having, in the second expansion stage 12, a system allowing the flow rate to be momentarily increased by simply pressing on a button 12a is a beneficial optional feature as this increase in flow rate may be actuated directly by the patient himself when he feels the need to do so, for example when he has to make a greater effort, especially when walking up a slope or climbing the stairs.

In all cases, the gas at the final pressure obtained flows via the internal gas passage as far as a housing 13, which emerges at the outlet orifice of the outlet interface, which housing 13 is designed to take part of the valve 14 or any other device that has to be connected thereto.

As explained above, introducing the valve 14 directed into the valve assembly through recesses 13a allows the pins 17 to be pushed back onto spring means 17a by means of two pins 14a fastened to the inlet interface of the valve 14, thereby releasing the rotation of the ring 18, the latter then being angularly connected to the valve 14.

During manual rotation of the valve 14, studs 19 allow the interface of the valve 14 to be trapped in the actuator 18 for the valve 9, that is to say the ring 18.

Rotating the valve 14 therefore rotates the ring 18, the ramps 18a, 18b acting on the slide 19, which moves transversely and allows the valve to be opened or closed, depending on the direction of rotation of the valve.

The outlet of the valve 14 is connected to an oxygen therapy nose clip 15 and, when the patient breathes in, the demand valve opens and gives the prescribed flow rate, which was defined by a nozzle in the valve during its manufacture.

Furthermore, preferably incorporated inside the body of the valve assembly 2 are also a dual-action rupture disc, as described in document FR 02/11318 or document U.S. Pat. No. 4,706,698 intended to offset any inopportune pressure increase due to an intense heat source, and a residual pressure valve that guarantees a minimum bottle draining pressure, therefore preventing on the one hand, any back-contamination by external impurities at the end of use when the bottle is empty or almost empty and, on the other hand, rinsing when the bottle is subsequently filled with a new charge of gas.

The valve assembly of the invention is packaged and ready for use, either individually or as a packet of several bottles, and is preferably covered with a protective film 16, preventing it from becoming dirty during transport, for example with a film of the standardized colour corresponding to the gas contained in the bottle 1 and having all the legally required information about the definition of the said gas.

The nose clip 15 and the demand valve 14 are held by the user patient, who is never separated therefrom since the equipment is suitable for a flow rate conforming to the prescription provided by his doctor.

The bottle/valve assembly of the invention, after all of the gas has been used by the patient, is returned to the gas distributor in order to be refilled with gas. Once refilled, the bottle/valve assembly undergoes the film-covering and packaging operation before it is re-shipped.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An integrated valve assembly with a main body comprising:
   a) an internal gas passage for conveying gas between a gas inlet and a gas outlet;
   b) a gas expansion means placed in said internal gas passage between said gas inlet and said gas outlet; and
   c) a locking valve used for controlling the release of the gas and comprising a rotary actuator that can be operated by the user, wherein said locking valve further comprises a blocking means that acts on the rotary actuator of the locking valve to prevent the rotation of said rotary actuator, said rotary actuator being centered on a boss of said valve assembly, wherein said boss supports said gas outlet and a connection means for connecting a gas use device provided with an inlet interface and with additional connection means capable of cooperating with the connection means and with said blocking means so as to permit said rotary actuator to rotate after said inlet interface has been connected to an outlet interface of the valve assembly.

2. The assembly of claim 1, wherein said blocking means further comprises one or more moving parts that cooperate with said rotary actuator to prevent its rotation and the release of the gas.

3. The assembly of claim 2, wherein said at least one moving part is pushed back by one or more spring means towards said rotary actuator so as to be at least partially housed in at least one recess provided in said rotary actuator and designed to accommodate at least one portion of said moving part, so as to prevent the rotation of said rotary actuator when said moving part is at least partially housed in said recess.

4. The assembly of claim 1, wherein said rotary actuator is a rotary ring.

5. The assembly of claim 3, wherein said one or more spring means are springs.

6. The assembly of claim 3, said one or more moving parts are selected from the group consisting of pins and balls.

7. The assembly of claim 1, wherein said gas expansion means comprises a first expansion stage and a second expansion stage that are placed in said internal gas passage, wherein said second expansion stage is located downstream of said first expansion stage.

8. The assembly of claim 7, further comprising:
   a) a residual pressure valve;
   b) a pressure gauge for displaying a pressure available in a bottle connected to the assembly;
   c) a filling connector;
   d) a filter; and
   e) a safety valve for discharging any possible overpressure in the event of failure or rupture of the first expansion valve element of the first expansion stage.

9. The assembly of claim 7, further comprising an instant action means, actuatable by an operator, which acts on said expansion means of said second expansion stage so as to instantly increase the released pressure and the flow rate of gas delivered, during the time that said means is being actuated by the operator.

10. The assembly of claim 9, wherein said instant action means is a button that compresses a piston release spring of said second expansion stage.

11. An apparatus which is portable and ambulatory, comprising a compressed-gas bottle onto which is fitted an integrated valve assembly according to claim 1, wherein said apparatus weighs less than 2 kg.

12. The apparatus of claim 11, wherein said compressed-gas bottle contains oxygen.

13. An apparatus comprising a compressed-gas bottle onto which is fitted an integrated valve assembly according to claim 1, wherein said apparatus weighs less than 2 kg.

14. The apparatus of claim 13, further comprising a gas use device connected, via an inlet interface, to said outlet interface, said gas use device comprising complementary connection means that cooperate with said connection means of said outlet interface of the valve assembly and with a locking means that acts on said rotary actuator so as to permit said rotary actuator to rotate and gas to flow from said valve assembly to said gas use device.

15. The apparatus of claim 14, wherein said gas use device is chosen from the group consisting of demand valves and flowmeters.

16. The apparatus of claim 11, wherein a protective shroud is placed so as to protect said integrated valve assembly.

17. The apparatus of claim 16, wherein said protective shroud is fastened to said valve assembly.

* * * * *